July 7, 1936. W. J. WINTER 2,046,989
ROTARY INTERNAL COMBUSTION ENGINE
Filed June 9, 1934 3 Sheets-Sheet 2
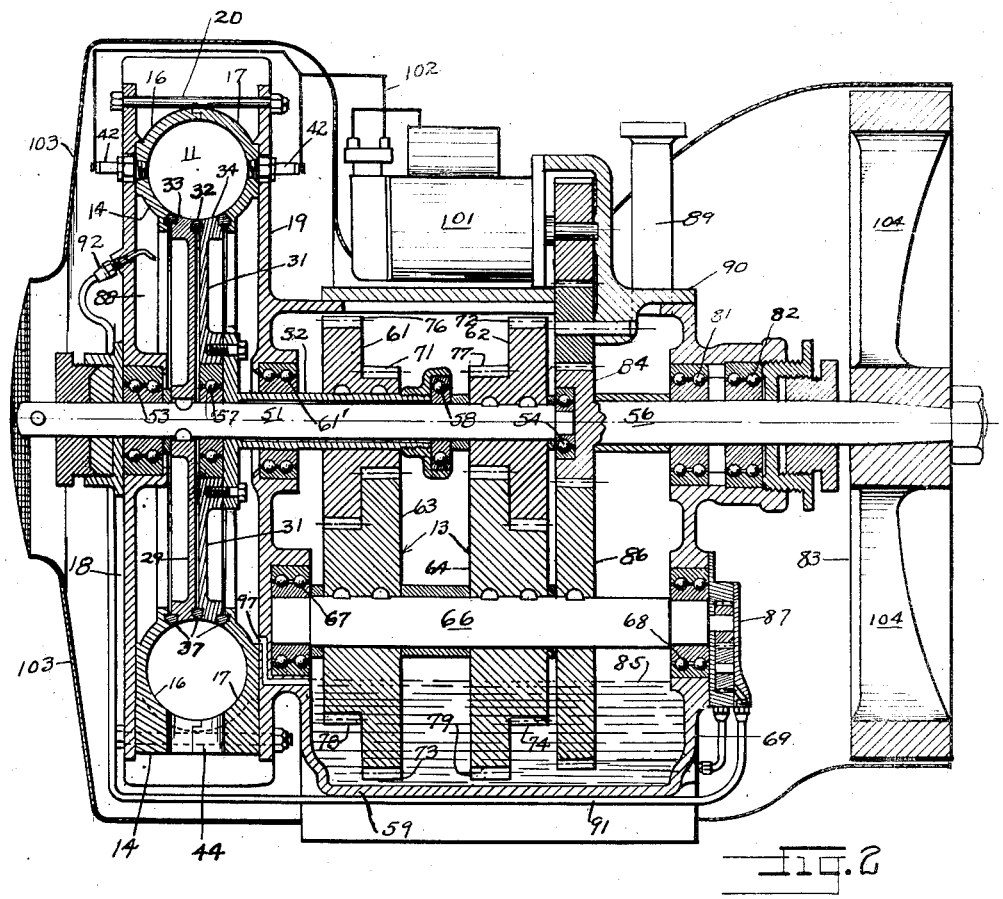
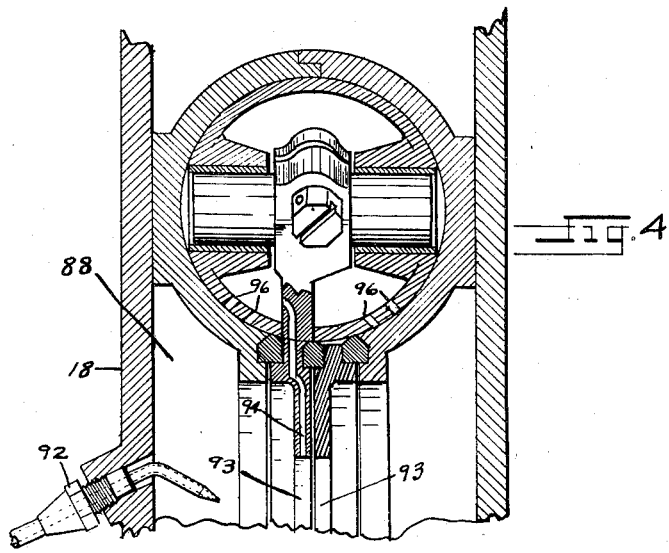
INVENTOR.
WILLIAM J. WINTER
BY Joseph B. Gardner
his ATTORNEY

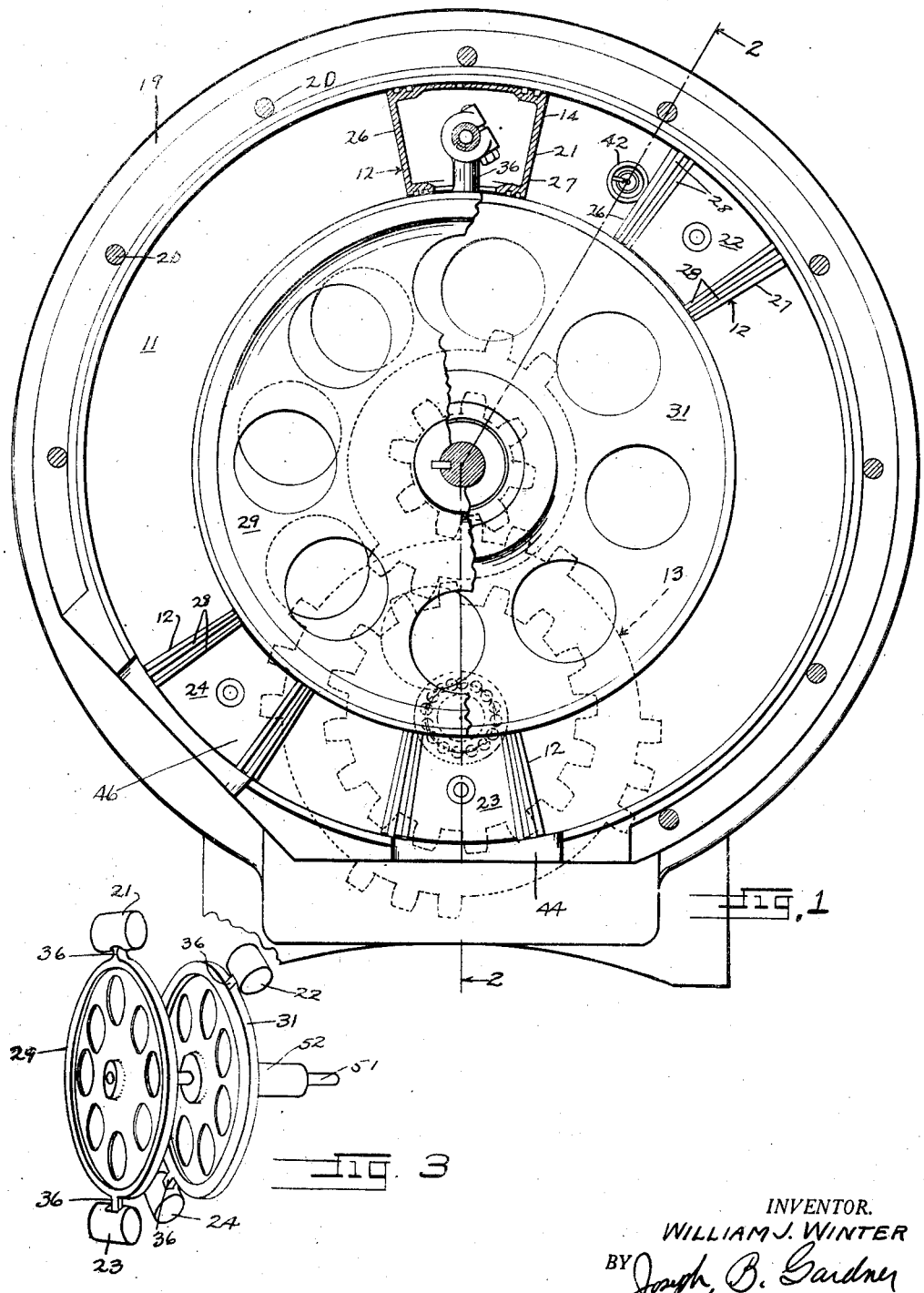

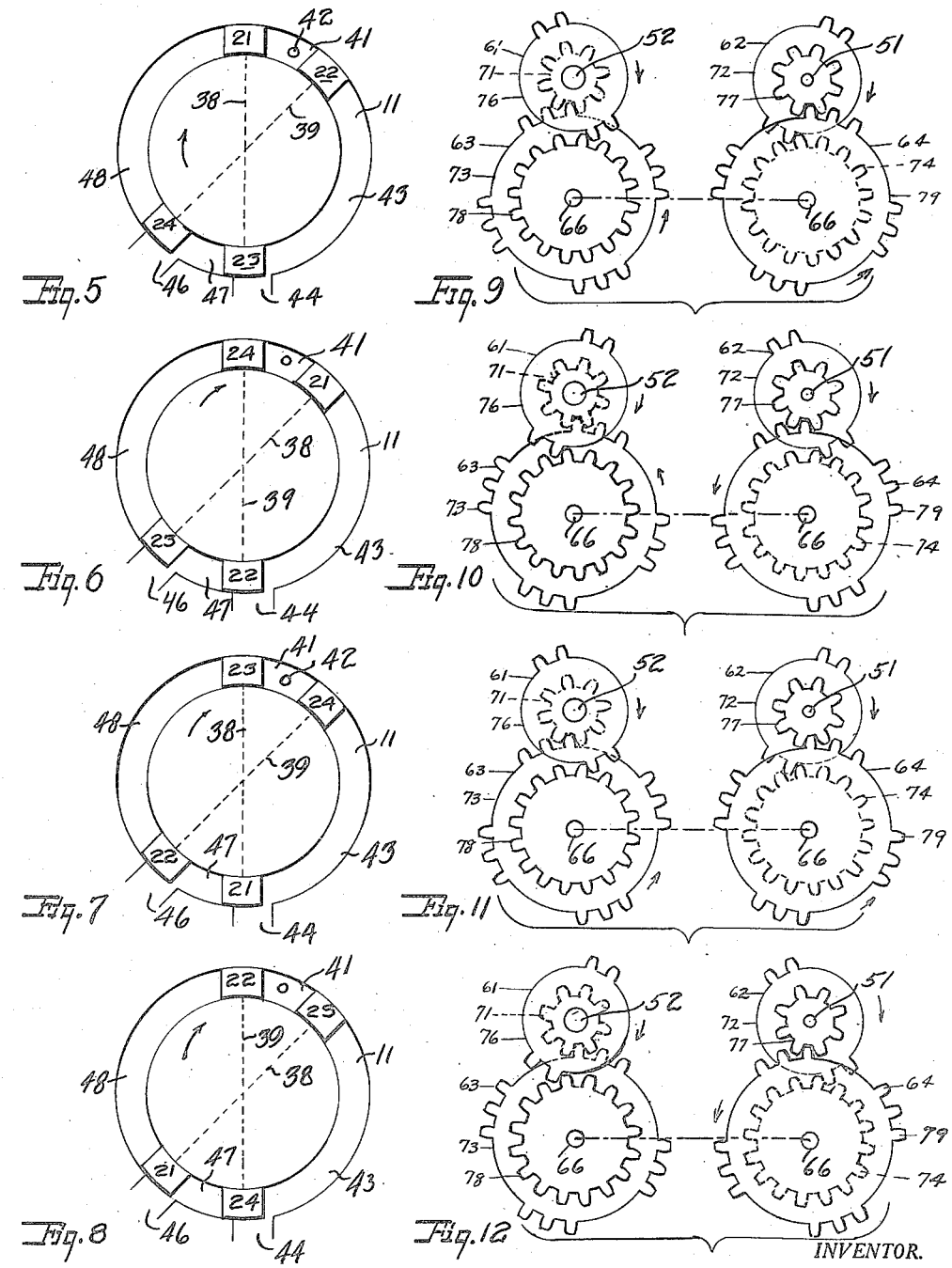

Patented July 7, 1936

2,046,989

UNITED STATES PATENT OFFICE 2,046,989

ROTARY INTERNAL COMBUSTION ENGINE

William J. Winter, Oakland, Calif.

Application June 9, 1934, Serial No. 729,756

7 Claims. (Cl. 123—11)

The invention relates to internal combustion engines, and particularly to the mode and organization of parts for carrying out the operation of the conventional four-cycle Otto engine.

An object of the invention is to provide an engine of the character described which will avoid the conventional reciprocation of the pistons and associated parts and provide for the continuous movement of these parts in but a single direction.

Another object of the invention is to provide an engine of the character described which will be greatly simplified both as to the number of parts used and to the operation of these parts. In accordance with my invention but four pistons are used to obtain the usual eight cylinder operation, and but single intake and exhaust passages and a single point of ignition are required. Also the power take-off of the engine, as well as the timing of the cylinder valves and ignition circuit, are so arranged as to entirely eliminate the conventional crank and cam shafts and associated valve operating mechanism and to simplify the operation of the usual ignition circuit and distributor therefor.

A further object of the invention is to provide an engine of the above character which will enable a longer period of intake and exhaust and provide a more perfect scavenging of the engine than has been heretofore attainable.

A further object of the invention is to provide an engine of the character described which will in operation develop a hot side and a cool side to thereby not only produce a desired unidirectional flow of heat through the engine but in addition afford the intake and compression of fuel exclusively at the cool side and the explosion and expansion of gases at the hot side.

Still a further object of the invention is to provide an engine of the character described which will provide for an increased length of the power stroke with a resultant improved control of the generated power.

Another object of the invention is to provide an engine of the character described in which the parts thereof will be arranged in a manner providing a substantially natural balance of the engine both statically and dynamically. With such an arrangement, as will be readily understood, vibration and attendant power loss may be reduced to a minimum.

Yet another object of the invention is to substantially entirely eliminate the tendency of piston slap in the engine and to thereby permit of a loose fit between the piston skirt and the cylinder and the operation of the engine at a higher temperature without danger of freezing of the pistons.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is an end view of an engine constructed in accordance with my invention and with an end plate and a half section of the cylinder block removed and with portions thereof broken away to show the inner engine construction.

Figure 2 is a longitudinal sectional view of the engine shown in Figure 1 and taken substantially on the plane of line 2—2 of Figure 1.

Figure 3 is a perspective view of the pistons and mounting assembly therefor.

Figure 4 is an enlarged fragmentary cross-sectional view showing the engine cylinder and piston assembly and a part of the lubrication means of the engine.

Figures 5, 6, 7, and 8 are diagrammatic views showing the successive positions of the pistons for each quarter cycle of operation of the engine.

Figures 9, 10, 11, and 12 are side views of gears for controlling the piston movement of the engine and show the successive engagement of such gears corresponding to the piston positions shown in Figures 5, 6, 7, and 8, respectively.

With reference to the drawings, the engine of my invention in brief comprises an annular cylinder 11, a set of pistons 12 rotatably mounted therein, and means 13 for causing the piston on rotation to periodically and uniformly approach and recede from one another. As may be understood, there is provided, in this manner, the compression and expansion of gases between the pistons while the latter are continuously rotating in a constant direction. In the present case advantage is taken of this compression and expansion in carrying out the cycles of operation of the usual Otto type internal combustion engine.

As may be best seen from Figures 1 and 2 the cylinder 11 is here provided in an annular block member 14 which, to facilitate assembly of the motor, is preferably formed of attachable half sections 16 and 17. With reference particularly to Figure 1 the block sections are formed around their opposed surfaces with annular recesses which register on attachment of the sections to define the engine cylinder 11. As here shown the sections are maintained in attached position by a pair of disc shaped end plates 18 and 19 which are fastened together around the outside of the block by bolts 20.

In the present engine I use a set of four pistons 21, 22, 23, and 24 which are mounted for rotation in the cylinder 11 and which differ from the conventional reciprocating type in that both ends 26 and 27 of the piston are closed and operative against the gases in the cylinder. The pistons are each provided adjacent the ends thereof with sealing rings 28 which serve as will be clear to seal the chambers defined in the cylinder between the pistons from one another. Means of connection to the pistons is here effected by a pair of disc members 29 and 31 which are arranged in side-by-side relation between the plates 18 and 19 substantially in the plane of the cylinder and are extended through an annular slot 32 formed jointly by the block sections and are hollowed slightly about their peripheries 33 and 34 to dispose the latter in substantially concentrically flush relation with the cylinder. Extending from diametrically spaced points on each disc is a pair of arms 36 which are connected to the pistons aforesaid, the pistons 21 and 23 being in this manner connected to for rotation with the disc 29 and the pistons 22 and 24 being similarly connected at diametrically spaced points in the cylinder for rotation with the disc 31. Means of seal between the cylinder and the members 29 and 31 and permitting relative movement of each with respect to the other here includes three annular rings 37 which are mounted intermediate the outer sides of the members and the cylinder block and between the members respectively.

It will now be clear that on movement of the pistons and the attached disc members, pistons 21 and 23 will rotate together around the cylinder in fixed diametrically opposed position to each other as will also the pistons 22 and 24. Diagrammatically this relationship is shown in Figures 5, 6, 7, and 8 in which are illustrated the operation of each piston throughout a complete operating cycle of the engine. An explanation of the engine operation may be facilitated by assuming a starting or a key position of the pistons. Such a position is illustrated in Figures 1 and 5 where the pistons 21 and 22 are shown in adjacent positions near one side of the cylinder and the pistons 23 and 24 in a similar but diametrically opposed position. For simplicity the fixed tie between the pistons afforded by the disc members 29 and 31 is illustrated in Figures 5 to 8 by dashed diametrical lines 38 and 39. With reference to Figures 1, 2, and 5, the confined space 41 between the pistons 21 and 22 is the firing chamber of the engine and accordingly there is suitably entered into this portion of the cylinder through the block 14 a spark plug 42 for igniting the fuel admitted and compressed in this space as hereinafter described. If desired, and as here shown in Figure 2, a pair of spark plugs may be mounted in the opposite sides of the cylinder block for insuring a proper ignition of the fuel. The power stroke of the engine is provided by the expanded space 43 between the pistons 22 and 23. Exhaust of the burned gases from the space 43 is arranged to be effected by a passage 44 formed in the cylinder block and leading from the cylinder at a position slightly in arrears of but partially covered by the piston 23. Thus on firing of the fuel in the space 41 the piston 22 will be moved through the space 43 to express therefrom and into the exhaust passage the burned gases between the pistons 22 and 23. In accordance with the piston control means 13 hereinafter set forth in detail, the movement of the piston 22 from a position shown in Figure 5 through the power stroke to a position previously occupied by piston 23, as illustrated in Figure 6, will be accompanied by a movement of the piston 23 but a relatively short distance to replace the piston 24. Intake of fuel into the engine is arranged to be effected through a passage 46 provided in the cylinder block and registering with the cylinder at a position, with reference to Figures 1 and 5, slightly in arrears of but partially covered by the piston 24. Thus on firing of the fuel in the space 41 the piston 24 will be rotated to increase the space 47 between the pistons 24 and 23 for drawing into such space a charge of fuel from the passage 46. On the other hand the other end of the piston 24 will move to compress the fuel in the space 48 between the pistons 24 and 21, and simultaneously move together with the piston 21 to convey the compressed fuel into the firing space 41.

In accordance with the piston control means 13, each piston is advanced through the cylinder during the duration of a quarter cycle to occupy the position of the piston next ahead. This progression is shown in Figures 5 to 8. As here shown, the quarter cycle progression between the piston positions of Figures 5 and 6 include ignition and power stroke between pistons 21 and 22, exhaust of the gases between the pistons 22 and 23, intake of fuel between the pistons 23 and 24, and compression between the pistons 24 and 21. The next quarter cycle illustrated between Figures 6 and 7 provides the firing and power stroke of the fuel compressed between cylinders 24 and 21, exhaust of the fuel burned on the previous quarter cycle between pistons 21 and 22, intake of fuel to the space between the pistons 22 and 23 from which space was exhausted the burned fuel on the preivous quarter cycle, and compression between the pistons 23 and 24 of the fuel drawn therebetween during the previous quarter cycle. The remainder of the operating cycle, as illustrated in quarter cycle steps from Figure 7 to Figure 8 to Figure 5, includes the firing, power stroke and exhaust between pistons 24 and 21, intake and compression between pistons 21 and 22 and compression and firing and power stroke between pistons 22 and 23. Thus on each revolution of the pistons, four separate cycles are simultaneously enacted in quarter cycle staggered relation which results in four power strokes for each revolution of the motor which is equivalent to the output of the conventional eight cylinder engine of the reciprocating type. The staggered operation of the individual chambers between the pistons may be summarized in the following table.

|  | Action between pistons 21 and 22 | Action between pistons 22 and 23 | Action between pistons 23 and 24 | Action between pistons 24 and 21 |
| --- | --- | --- | --- | --- |
| Quarter cycle represented between Figs. 5 and 6. | Ignition power stroke. | Exhaust | Intake | Compression. |
| Quarter cycle represented between Figs. 6 and 7. | Exhaust | Intake | Compression | Ignition power stroke. |
| Quarter cycle represented between Figs. 7 and 8. | Intake | Compression | Ignition power stroke. | Exhaust. |
| Quarter cycle represented between Figs. 8 and 5. | Compression | Ignition power stroke. | Exhaust | Intake. |

As previously mentioned, the successive advancement of the pistons through the positions shown in Figures 5, 6, 7, and 8 is controlled by the means 13 which in the present embodiment includes a set of gears which move into and out of registration to cause first an advancement, for the first quarter cycle mentioned in the table, of the pistons 22 and 24 at a faster rate of speed than the pistons 21 and 23. Following the first quarter cycle the gears automatically shift to rotate the pistons 21 and 23 faster than pistons 22 and 24 and again change at the end of the second and third and fourth quarter cycles to produce the movement mentioned for the first, second and first quarter cycles respectively. In carrying out this control, the disc members 29 and 31, to which the pistons are attached, are mounted at their centers to a pair of axially extending shafts 51 and 52. As may be best seen from Figure 2, the shaft 51 is supported adjacent one end in a bearing 53 carried by the outer end plate 18 and at the other end in a bearing 54 provided in the end of a power takeoff shaft 56, and the shaft 52 comprises a tubular member mounted concentrically about the shaft 51 and is supported for relative rotation thereon by spaced bearings 57 and 58. Preferably the shafts extend through the inner end plate 19 into a gear casing 59 which is here shown integrally formed with and extended from the plate 19. An additional support for the shafts is here provided by a bearing 61' which is provided in the plate 19 and engages about the outer shaft 52.

The interrelation between the shafts 51 and 52 for carrying out the piston control above mentioned is here effected by four double faced gears 61, 62, 63, and 64, two of which, 61 and 62, are mounted on the shafts 52 and 51 respectively while the other two, 63 and 64, are mounted on a counter shaft 66 and engage respectively with the gears 61 and 62. Support of the counter shaft in spaced parallel relation to the shafts 51 and 52 are here effected by bearings 67 and 68 engaging the ends of the shaft and mounted in the end plate 19 and the outer end 69 of the casing 59.

With reference to Figures 1 and 5, it will be noted that for the first quarter cycle described, the rotational movement of the pistons 21 and 23 to the position occupied by pistons 22 and 24 is but one third of the movement of the pistons 22 and 24 in displacement to the positions occupied by pistons 23 and 21. Since the pistons are attached to, for rotation with, the shafts 51 and 52, this same relationship of movement may be translated to an angular displacement of the shaft 52 three times as great as that of shaft 51. Accordingly for the first quarter cycle a three to one reduction in angular movement is established, by the set of gears 61, 62, 63 and 64, between the shafts 52 and 51. This reduction is illustrated in Figure 9 where the engagement of the periphery portions 71 and 73 of the gears 61 and 63 effect a three to one reduction between the shaft 52 and the counter shaft 66, and the engagement of the periphery portions 72 and 74 of the gears 62 and 64 effect a one to one ratio of movement between the counter shaft and the shaft 51. As an important feature of this arrangement the teeth on the peripheries 72 and 73 are grouped to engage for but a quarter cycle movement of the pistons. At the end of first quarter cycle corresponding to Figure 6 and as shown in Figure 10 the periphery portions 71, 72, 73, and 74 become disengaged by reason of the grouping of teeth aforesaid and the second periphery portions 76, 77, 78, and 79 of the gears enter into engagement to provide a one to one ratio of movement between the portions 76 and 78 and the shafts 52 and 66, and a three to one increase in speed between the portions 79 and 77 and the counter shaft 66 and the shaft 51. The teeth on the portions 76 and 79 are likewise grouped to disengage at the end of the second quarter cycle and which disengagement is accompanied by a reengagement of the gear portions 71 and 72, 73, and 74 as shown in Figure 11 for accelerating the movement of the pistons 22 and 24 during the third quarter cycle of operation. Similarly at the end of the third quarter cycle, and as shown in Figure 12, gear portions 71, 72, 73 and 74 disengage and the portions 76 and 77, and 78 and 79 become automatically engaged for controlling the movement of the pistons through the fourth quarter cycle as shown in Figure 8, whereupon at the end of this quarter cycle the gears again automatically engage as shown in Figure 9 for again starting on the first quarter cycle. Thus the engagement and disengagement of the gear portions is completely automatic in operation to carry out the leading and lagging of the piston movements hereinbefore described.

While the shafts 51 and 52 are, during the operation of the engine, periodically and uniformly speeded up and retarded, it may be understood that the counter shaft 66, by reason of the periodically changing gear ratios, is rotated at a substantially constant speed. Accordingly it is with this counter shaft that the power take off of the engine is effected. As here shown in Figure 2, the power shaft 56 is carried in a pair of bearings 81 and 82 mounted in the end 69 of the gear casing and extends through such end for attachment to a fly wheel 83. Connection between the power and counter shafts is here effected by gears 84 and 86 which may be of any suitable ratio for establishing a desired relation between engine and power shaft speed. For instance, in automobile practice a relatively low speed engine for higher drive shaft speeds is in many cases desirable to save the engine from excessive wear, whereas in airplane practice where the most efficient propeller speed is relatively small compared to a high power output speed of the engine a reversed ratio of engine to power shaft speed is desirable.

For lubricating the engine parts a constant supply of oil is stored in the gear casing at a level 85 above the lower edges of the gears from where the oil is drawn by means of a pump 87 for injection into the chamber 88 defined between the cylinder block and the end plates 18 and 19. A suitable intake spout 89 is here provided on the top plate 90 of the gear case for entering oil. The pump may be mounted at the end of the gear casing for driving from the counter shaft 66 and is connected to a conduit 91 which extends outside the casing and around the engine to an injection nozzle 92 mounted in the end plate 18. As illustrated in Figures 2 and 4, the nozzle may be inclined slightly downward for injection of oil into openings 93 provided in the disc members 29 and 31 from where the oil is carried by centrifugal force through radially extending passages 94 to the inside of the pistons. As here shown the piston walls are provided with openings 96 for the escape of oil therethrough onto the cylinder. Return of oil from the chamber 88 is by way of a drain passage 97 extending through the end plate 19.

The ignition circuit of the engine may be more simply carried out than in the case of the usual multi-cylinder type engine, since in the present engine the ignition occurs only at one point and in the simple relation of four times for each revolution of the engine. With reference to Figure 2 I may mount the generator, timer and coil assembly 101 on the top plate of the gear casing and drive the generator and timer from the power takeoff gear 84. Any suitable design of timer may of course be used provided only that a make and break of the electric circuit through the coil be effected at the end of each quarter cycle movement of the pistons hereinbefore set forth. Connection of the high tension side of the coil may be made with the spark plugs by means of a conductor 102, the return ground connection being effected in the usual manner through the engine casing.

Cooling of the present motor is also simpler than in the usual type by reason of the higher temperature of operation which is permissible. In the embodiment here shown I provide for an air cooling of the motor and to this end the motor casing proper is jacketed in a cowling 103 which defines with the latter an annular air passage about the engine longitudinally thereof. As a means for stimulating air flow the fly wheel 83 is formed with openings therethrough defined between fan shaped spokes 104 which serve on rotation of the fly wheel to draw air over the motor casing.

It will now be clear that the engine of my invention provides for the continuous rotation of the pistons as contrasted to the reciprocating movement heretofore and provides further during such rotation for the movement of the pistons to and from each other to cause a compression or permit expansion of the gases confined therebetween to carry out the full cycle of operation of an internal combustion engine. Also as will be understood while the present engine is adapted to operate on the conventional Otto cycle, it may be readily converted for Diesel operation by merely increasing the length of the pistons to obtain a higher compression, drawing in pure air through the intake passage instead of fuel mixture, and causing an injection of the fuel into the compressed space between the pistons at the point of ignition.

Further it will be noted that the pistons in their movement across the intake and exhaust ports afford an automatic valve action without entailing the usual separate cylinder valves and associated operating mechanism. Not only is an important elimination of parts thus effected, but since a single intake is used for each pair of pistons absolute uniformity of fuel mixture is insured and the manifolding problem present in the conventional engine is entirely eliminated. Also since each part of the cylinder is in simultaneous double use a much longer power and exhaust stroke is obtainable. In the present engine each of these strokes is for substantially 135 degrees of the engine rotation contrasted to a maximum of approximately 105 degrees for the usual reciprocating engine. Not only is a better controlled power stroke in this manner afforded, but also when considered with the relatively larger discharge opening used, a vastly improved scavenging of the engine is likewise obtained.

It will also be noted that in contrast to the usual motor, the power stroke and exhaust occurs on one side of the cylinder only and the intake and compression are exclusively confined to the other side. As a result only the first mentioned side of the engine will be intensely heated and the intake and compression of gases will never take place in a heated cylinder but only over the relatively cool side of the engine. Also the relative constancy of the hot and cool sides of the engine makes for a constant uni-directional flow of heat through the engine which not only reduces heat losses but facilitates cooling.

Also by reason of the movement of the pistons in a constant rotational direction, and in the absence of reciprocating crank arms, there is no tendency for piston slap. As a result a tight fit of the piston skirt in the cylinder is obviated and freezing or binding of the pistons in the cylinder, regardless of the temperature developed, is substantially impossible. This feature too enables the use of a higher operating temperature of the engine.

An additional feature of the engine is the positioning of the pistons in the cylinder and the mounting of the disc members 29 and 31 to provide a natural symmetry and balance about the center shafts 51 and 52. Thus a smoother operating engine results and much of the common vibration and the attendant power loss is entirely eliminated.

I claim:

1. In an engine of the character described, an engine block providing an annular cylinder, pistons mounted for rotation in said cylinder and defining therebetween and with said cylinder a chamber, sets of gears interconnecting said pistons and movable successively into and out of engagement to cause on rotation of the pistons for the uninterrupted advance thereof and for the movement of first one piston and then the other at a faster speed than the first to cause a periodic expansion and contraction of said chamber and to cause said pistons to move at a uniform and constant speed during each cycle of movement, means for introducing fuel into said chamber, means for causing the ignition of said fuel when the chamber is compressed for causing an expansion thereof, and means for exhausting the burned fuel from said chamber after expansion thereof from ignition.

2. In an engine of the character described, an engine casing providing an annular cylinder, pistons mounted for rotation in said cylinder and defining therebetween and with said cylinder individual chambers, means interconnecting said pistons in diametrically opposed pairs and arranged in one position of rotation of the pistons to dispose two pistons comprising one of each pair in adjacent position at one side of the cylinder and the other of said pairs in diametrically opposed relation at the opposite side of said cylinder whereby the chambers between said two pistons and the opposite pistons will be compressed and the chambers between the other pistons will be expanded, sets of gears for controlling the movement of said pistons and movable successively into and out of engagement to cause on rotation of the pistons for the uninterrupted advancement of each of said pistons at a uniform and constant speed to a position previously occupied by the piston next ahead whereby said compressed chambers will be expanded and said expanded chambers will be compressed, means for igniting fuel in one of said compressed chambers in said first piston position, a discharge port registering with the expanded chamber next ahead, and a fuel intake port registering with the compressed chamber next ahead.

3. In an engine of the character described, an engine block member provided with an annular cylinder and fuel intake and exhaust passages having ports registering with said cylinder at adjacent points on one side thereof, a spark plug mounted in said block and registering with said cylinder at a position substantially diametrically spaced from said ports, pistons revolubly mounted in said cylinder and arranged in one position thereof with one piston positioned to the rear of said spark plug, a second piston positioned ahead of said first piston and defining therewith and with said spark plug a combustion chamber, a third piston positioned ahead of said exhaust port and defining with the second piston a chamber open to said exhaust port, a fourth piston positioned ahead of said intake port and defining with said third piston a chamber communicating with said intake port and defining with said first piston a chamber arranged for compression, and sets of gears connecting said pistons and movable into and out of engagement for controlling and effecting the uninterrupted rotation of said pistons for the simultaneous and successive advancement of each piston at a uniform and constant speed to the position occupied by the piston next ahead.

4. An internal combustion engine comprising, a casing provided with an annular cylinder and having inlet and discharge passages opening to said cylinder in adjacent spaced relation at one side of the cylinder, ignition means communicating with said cylinder at an opposite side thereof, pistons mounted in and movable around said cylinder and defining therebetween individual chambers, and sets of mutilated gears connecting said cylinder and movable into and out of engagement and serving on rotation of the pistons to cause the uninterrupted advance of said pistons and causing, over a portion of the circumference of the cylinder, for the movement of certain of said pistons at a faster velocity than others and over other portions of said circumference for a reversal in relative piston velocities whereby said chambers will be periodically expanded and contracted and successively moved into registration with said inlet and discharge passages and said ignition means to carry out the several cycles of operation of an internal combustion engine.

5. An internal combustion engine comprising, a casing provided with an annular cylinder and having inlet and discharge passages opening to said cylinder in adjacent spaced relation at one side of the cylinder, ignition means communicating with said cylinder at an opposite side thereof, pistons mounted in and movable around said cylinder and defining therebetween individual chambers, said casing being provided with an annular opening therethrough to the inner side of said cylinder, disc members entering through said opening and connected to for rotation with said pistons, sealing rings mounted in said opening to prevent leakage therethrough from said cylinder, a pair of axially extending shafts one mounted for rotation within the other and connected to for rotation with said disc members, a counter shaft mounted in spaced relation to said first shafts, intermeshing gears on said shafts, certain of said gears being mutilated so as to move into and out of mesh over portions of their peripheries and serving on rotation of the pistons to cause a continuous and uninterrupted advancement of said pistons and to afford, over a portion of the circumference of the cylinder, for the movement of certain of said pistons at a faster velocity than others and over other portions of said circumference for a reversal in relative piston velocities whereby said chambers will be periodically expanded and contracted and successively moved into registration with said inlet and discharge passages and said ignition means to carry out the several cycles of operation of an internal combustion engine.

6. In a device of the character described, a casing providing an annular cylinder, pistons mounted in and movable around said cylinder and defining therebetween individual chambers, and gears connected to said pistons and in mesh with each other and serving on rotation of the pistons to cause, over a portion of the circumference of the cylinder, for the movement of certain of said pistons at a faster velocity than the others and over other portions of said circumference for a reversal in relative piston velocities whereby said chambers will be periodically passed through a cycle of expansion and contraction, said gears serving to at all times cause the uninterrupted advancement of all of said pistons and maintaining a fixed and constant speed ratio between said pistons during each of said cycles.

7. An internal combustion engine comprising, a casing provided with an annular cylinder and having inlet and discharge passages opening to said cylinder, pistons mounted in for movement around said cylinder and defining therebetween and with said cylinder a chamber, a pair of members projecting through said casing and connected to said pistons, a pair of shafts mounted one axially within the other and connected to said members, a counter shaft mounted in spaced parallel relation to said first shafts, sets of gears mounted on said shafts and successively movable into and out of registration on rotation of the pistons for causing a continuous advancement of said pistons with first one and then the other of said pistons at a greater speed than the other to cause a periodic expansion and contraction of said chamber and to cause said pistons to move at a uniform and constant speed ratio during said expansion and contraction of said chamber.

WILLIAM J. WINTER.